Nov. 10, 1970         D. A. BUTTS         3,538,783
ENERGY ABSORBING DEVICE AND METHOD OF ASSEMBLY THEREOF
Filed June 6, 1968                        2 Sheets-Sheet 1

INVENTOR.
Donald A. Butts
BY
D. L. Ellis
ATTORNEY

United States Patent Office 3,538,783
Patented Nov. 10, 1970

3,538,783
ENERGY ABSORBING DEVICE AND METHOD OF ASSEMBLY THEREOF
Donald A. Butts, Saginaw, Mich., assignor to General Motors Corporation, Detroit, Mich., a corporation of Delaware
Filed June 6, 1968, Ser. No. 734,920
Int. Cl. B62d 1/18
U.S. Cl. 74—492                                                4 Claims

ABSTRACT OF THE DISCLOSURE

In an energy absorbing device of the type including a pair of telescopic tubular members and a plurality of deformer balls or like bodies engaged between the members with substantial interference fit so as to roll and cause localized deformation in the members under telescopic movement thereof, improvement is had in the use of an intermediate sleeve member perforated to receive the various deformer balls and hold them to roll in fixed relationship during telescoping of the tubular members. In assembly of the device, the balls are press-fitted into the perforations of the sleeve and the sleeve and ball unit is placed to be forced between the members by telescopic insertion of one member relative to the other to the desired assembled position.

---

This invention relates to improvements in energy absorbing devices of the type comprising telescopically arranged tubular members having engaged therebetween a plurality of rollable deformer bodies operative for localized energy dissipating cold working of the members.

In the White Pat. 3,392,599 issued July 16, 1968 and assigned to the assignee of the present invention, there is disclosed an energy absorbing device suitable for use in automotive vehicle collapsible steering columns or like environments and wherein a pair of tubular members are coaxially arranged for telescoping movement under force loading thereon, with a plurality of spheroids being engaged between the members at spaced locations therearound and with a substantial interfering fit therewith such that the spheroids are operative to roll during the telescoping movement and cause localized plastic strain grooving and deformation in the walls of the members to absorb the energy of the telescoping movement. The present invention provides improvements in the White device enhancing the performance of the rolling spheroids and also enabling highly efficient assembly operations in construction of the device.

A feature of this invention is the provision in energy absorbing devices of the class described of guidance and retention means for the rollable deformer bodies, such means taking the form of a sleeve or like member fittable intermediate the telescopic tubular members and perforated or otherwise formed to receive and maintain the various deformer bodies in predetermined relationship with each other during telescoping movement of the members.

Another feature of this invention is the utilization of such a sleeve in an expeditious method of assembly of the energy absorbing device by having the various deformer bodies press-fitted within the sleeve as a unit therewith, such unit thus being adapted for assembly between the telescopic members by suitable forcible telescoping of the members to establish the interfering engagement of the deformer bodies in such a manner that they and the sleeve roll or telescope as a unit to the desired assembled position ready for use.

These and other features and advantages of the invention will be readily apparent from the following description and from the drawings wherein.

Figure 1:
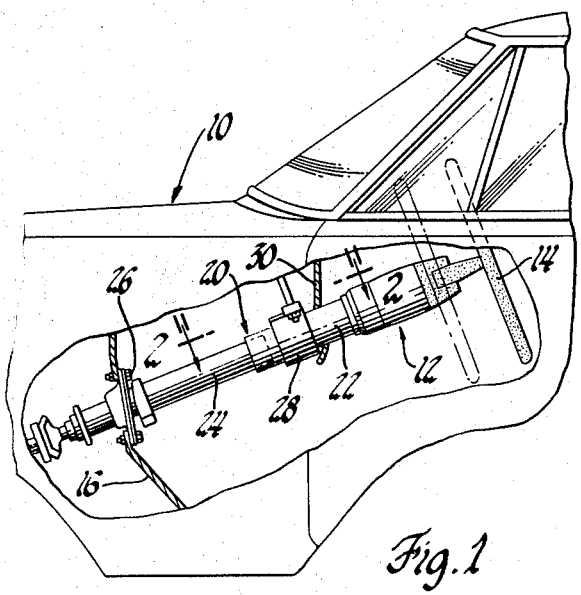
FIG. 1 is a parially broken away elevational view of an automotive vehicle body including a collapsible steering column assembly embodying an energy absorbing device according to the present invention.

Referring now particularly to FIG. 1 of the drawings, the energy absorbing device of the invention is disclosed as embodied particularly for use in an automotive vehicle collapsible steering column assembly 12 for a vehicle body 10. Reference may be had to the above-identified White application Ser. No. 606,431 for the details of structure and operation of column 12, but basically, it includes an outer column or jacket 20 including upper and lower telescopically arranged cylindrical portions 22 and 24 respectively rigidly joined by structure hereinafter described to operate as an energy absorber according to the principals generally contemplated in this invention. Jacket 20 is mounted rigidly adjacent its lower end on firewall 16 by a bracket assembly 26 and adjacent its upper end by another bracket assembly 28 joining the column assembly to the vehicle body instrument panel structure 30. Bracket assembly 26 holds lower portion 24 of the jacket assembly 20 rigidly with firewall 16 against displacement relative thereto in either axial direction, while bracket assembly 26 permits forward displacement of upper portion 22 but prevents rearward displacement thereof relative to the instrument panel 30.

The jacket 20 rotatably supports and houses the conventional steering shaft 32 extending from the steering wheel 14 through the jacket for connection at the other side of firewall 16 with the usual vehicle steering gear, not shown. The steering shaft assembly includes an upper and lower telescopically arranged and relatively nonrotatable portions 34 and 36 joined by suitable shear plug structure 38 which holds the shaft sections in the position shown in FIG. 2 until a predetermined axial force is applied to the steering shaft in either direction sufficient to fracture the plugs. Under such axial force loading on the steering column assembly 12 in either direction and of a value exceeding a predetermined value as hereinafter described, both the steering shaft 32 and the jacket 20 will axially telescopically shorten or callapse, while the energy absorbing features of jacket 20 serve to dissipate the energy of the forces applied to the column during such collapse.

Figure 2:
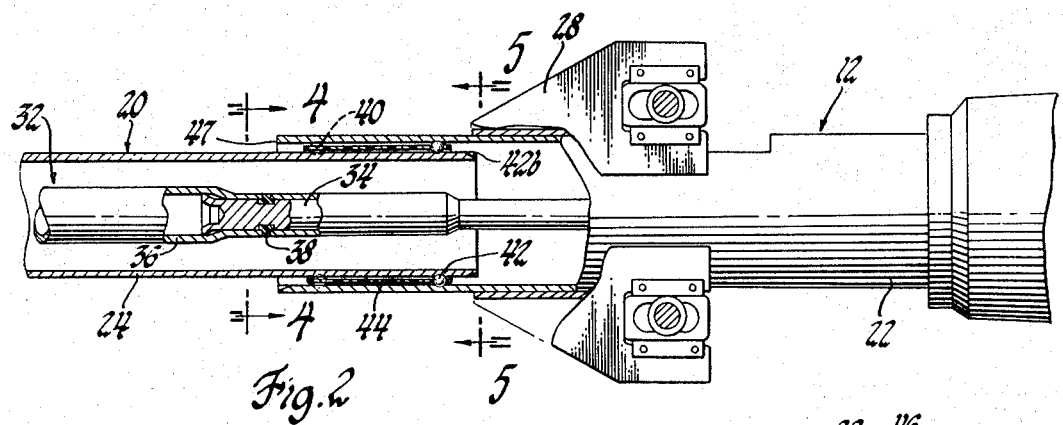
FIG. 2 is an enlarged partially broken away view of the steering column taken generally along the plane indicated by lines 2—2 of FIG. 1.
Figure 3:
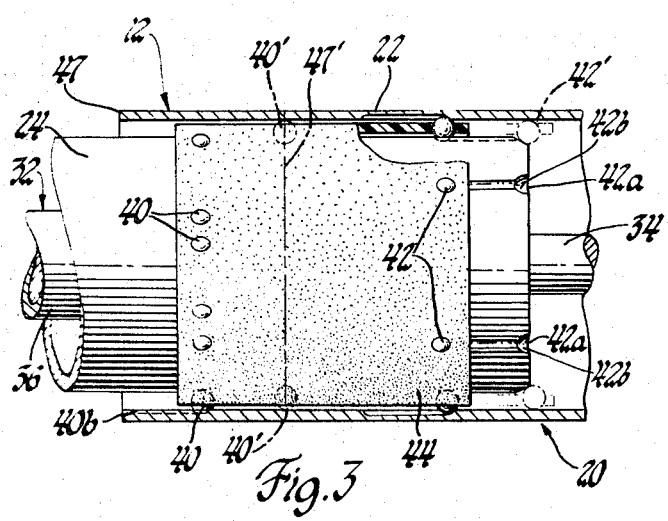
FIG. 3 is a partially broken away view enlarged from a portion of FIG. 2.

Referring to FIGS. 2 and 3, the energy absorbing construction present in support jacket 20 is basically identical to that described in the White application above noted. Jacket portions or cylinders 22 and 24 have engaged therebetween two annular rows of deforming spheroids or balls 40 and 42, the spheroids having such a degree of interference fit therebetween as to be operative to cause predetermined plastic strain groove-like deformation in the engaged regions of the cylinders when they are caused to telescope or collapse under impact loading thereon.

Figure 4:
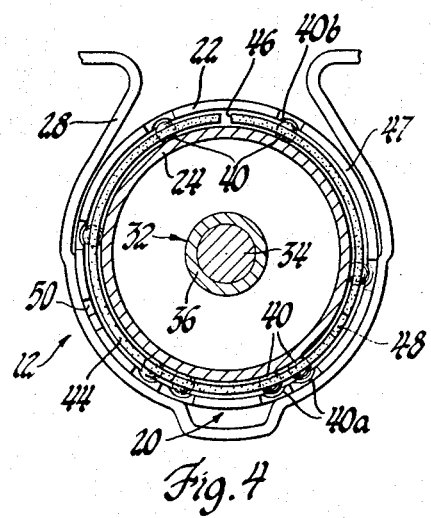
FIG. 4 is an enlarged sectional view taken generally along the plane indicated by lines 4—4 of FIG. 2.
Figure 5:
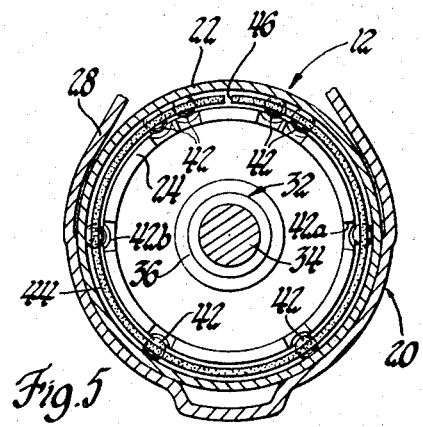
FIG. 5 is an enlarged sectional view taken generally along the plane indicated by lines 5—5 of FIG. 2.

As explained more fully in White, and as seen with some particularity in FIGS. 3, 4 and 5, the various spheroids 40 and 42 are selected to be of such a size in relation to the diametrically measured annular space or gap between the portions 22 and 24 as to be interferingly engaged in this gap between the interior and exterior surfaces of the portions with a contact pressure substantially above the yield value or Hertzian yield stress for the material of one or both portions 22 and 24, so that the latter experience localized plastic deformation in the regions of the spheroid contact. Spheroids 40 and 42 are preferably selected with a hardness at least two and one half times that of the cylinders to bring about this plasticity therein without substantially deforming the spheroids. When steering column assembly 12 is subjected to a predetermined substantial axial loading or impact, for example in a forward direction under engagement of the driver's torso with steering wheel 14, the mast jacket portion 22 seeks to telescope downwardly over portion 24 along with telescoping of steering shaft section 34 downwardly into section 36. As set out fully in White, the loading on column assembly 12 required for such collapse is controlled by correct sizing of spheroids 40 and 42. As one of these mast jacket portions telescopes over the other, it causes the spheroids 40 and 42 to roll in this same direction over the contacted surfaces of both portions such that the plastically strained regions of the surfaces thereof resulting from such rolling take the form of axially extending grooves or furrows. The energy dissipated in this plastic deformation of the mast jacket portions of course serves to effectively and gradually bring the steering column collapse to a halt and reduce the chances of injury to the vehicle occupants.

Figure 6:
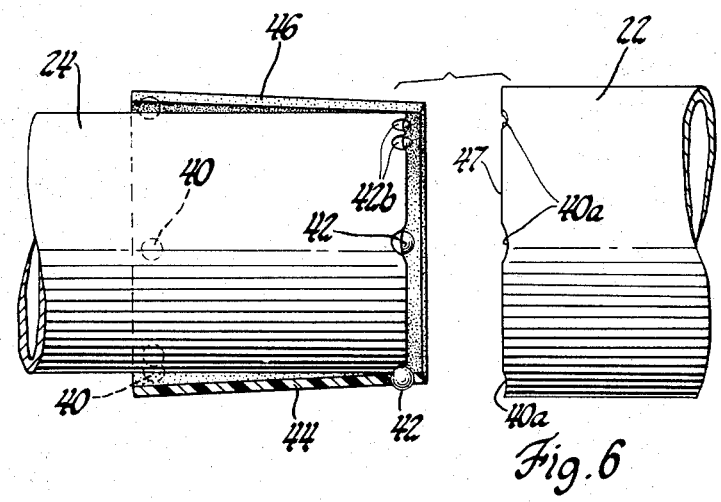
FIG. 6 is an exploded elevational view showing a step in the method of assembly of the device.

The present invention provides improvement in such energy absorbing devices particularly in both their energy absorbing performance and additionally in a simplified expeditious method of assembly of the portions 22 and 24 into interfering engagement relationship with the spheroids 40 and 42. As seen best in FIGS. 3, 6 and 7, a sleeve member 44 is provided to be installed between portions 22 and 24. The sleeve 44 is preferably fabricated of nylon or similar plastic material which is generally rigid or self-sustaining as to form, and is slit or formed with a lengthwise gap 46 for flexibility of shape as will appear hereinafter. The sleeve is further provided with a series of perforations or circular apertures for receiving the various spheroids 40 and 42.

Preferably, particularly in the steering column environment shown herein, the perforations are provided in at least two annular rows spaced axially of the sleeve so that the spheroids when fitted therewithin will establish spaced annular connections with the mast jacket portions 22 and 24 whereby to form a relatively rigid unit for the mast jacket 20 and which will render the mast jacket relatively insensitive to any adverse side loadings under impact conditions, all as explained in White. The perforations in the two annular rows are staggered angularly with respect to each other so that the spheroids do not tend to roll in the same axial paths on the cylindrical surfaces of the portions 22 and 24 during collapse of the steering column assembly 12.

Figure 7:
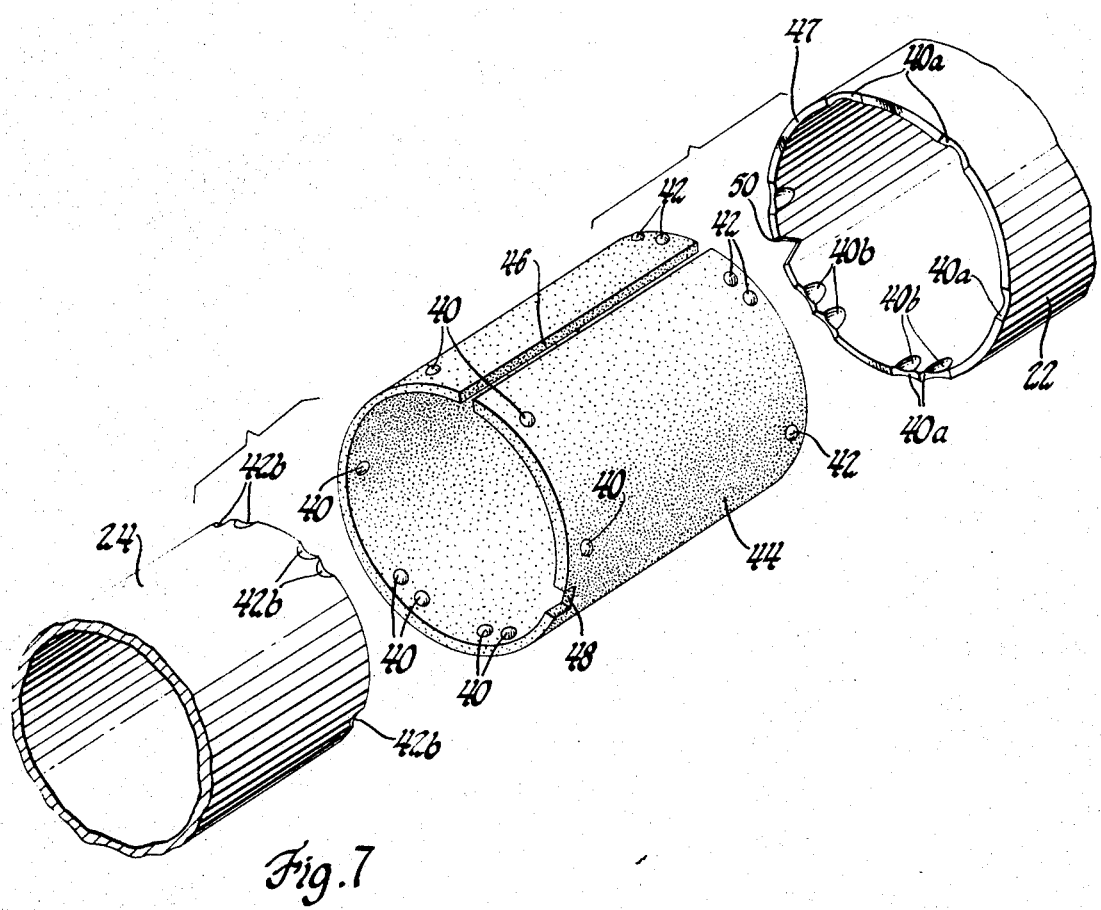
FIG. 7 is an exploded perspective view.

The perforations in the sleeve 44 have a diameter slightly smaller than the diameter of the spheroids 40 and 42 selected to be received therein such that the spheroids when installed will have a significant press fit sufficient to retain them in the sleeve for expedited assembly procedures, the resulting subassembly or unit being shown in FIG. 7. Further to the staggered relationship of spheroids 40 and 42 in the sleeve 44 to achieve distinct rolling paths for the spheroids, it is preferred that some of the spheroids 40 and 42 be grouped on or about a generally vertical plane through the steering column assembly 12 to correspond with some of the higher load bearing areas which arise in the steering column jacket 20 during normal use. As seen best in FIG. 4, two pairs of spheroids 40 are located closely to either side of a vertical plane through the center line of steering column assembly 12 at the underside region of the lower end of sleeve 44. Likewise, two similar pairs of spheroids 42 are located adjacent this vertical center plane in the upper end of sleeve 44 revolved 180° from the aforementioned grouping. These groupings provide increased load bearing regions or points adjacent this vertical center plane to accommodate whatever significant bending moments which may be applied to the column during normal use tending to bow it downward at its steering wheel end. This occurs frequently, for example, when the vehicle operator bears on the steering wheel to assist his entry or exit to and from the vehicle. Thus, there is avoided a condition of undue strain or fatigue of the mast jacket portions 22 and 24 in these designated local areas of spheroid contact tending to loosen the fit of the spheroids 40 and 42, or to perhaps impede or inhibit their desired rolling action during any energy absorbing excursion that might arise.

The use of sleeve 44 provides advantages in the energy absorbing performance of the spheroids 40 and 42 through its function of guiding the spheroids or holding them in their predetermined spaced axial and angular relationship relative to each other. When overcoming the press fit with which they are installed in sleeve 44, the spheroids 40 and 42 will be caused to roll within the perforations of the sleeve under the forces applied by the telescoping mast jacket portions 22 and 24 and will be held by the sleeve to roll in their predeterminedly spaced paths about the surfaces of the mast jacket portions. The total spheroid complement may thus be closely angularly spaced without undue likelihood of the rolling paths of neighboring spheroids merging with each other to alter performance. Sleeve 44 causes all of the spheroids 40 and 42 to complete the full energy absorbing excursion or axial stroke to which they are subjected by the mast jacket portions. If any individual spheroid encounters some macroscopic surface defect or unevenness in the mast jacket portions during such excursion, it will not tend to skid or bind thereon to detract from its performance since the rolling forces applied to axially displace the various other spheroids, and thereby the sleeve, will force the troubled spheroid to keep rolling at an even rate with the remainder of the spheroid complement.

Sleeve 44 also provides for improved assembly procedures for the energy absorbing devices contemplated herein. As mentioned, the various spheroids 40 and 42 are press-fitted within the perforations of the sleeve so that the spheroids and sleeve become an easily handled unit reducing the number of parts of jacket 20 which must be assembled to essentially but three. Prior to the actual assembly operation, the inner diameter of the upper mast jacket portion 22 and the outer diameter of the lower mast jacket portion 24 are measured to properly select the size of the spheroids 40 and 42 to be used in the energy absorbing device. Within the range of manufacturing tolerances normally encountered in fabrication of tubular members such as these mast jacket portions, a limited range of available sizes of the spheroids 40 and 42 within a sleeve 44 may be on hand for selection by the assembly operator to correspond with the desired interference fit of the spheroids between the two mast jacket portions. Also prior to actual assembly, the mast jacket portions 22 and 24 are preferably provided at the lower and upper ends thereof respectively with a series of starting notches and indentations or scallops. As seen best in FIG. 7, the mast jacket portion 22 includes a series of notches 40a directly on the thickness or end surface 47 thereof which will serve to help locate the correspondingly related spheroids 40 in the sleeve 44 in their proper rotary position or relationship to the mast jacket portion during assembly. Further, for each of the end notches 40a, there is provided a tapered or reducing depth scallop or indentation 40b formed in the inside peripheral surface of mast jacket portion 22. Similar notches and scallops 42a and 42b on the mast jacket portion 24 are formed for spheroids 42 as indicated on the outer surface thereof as seen in FIG. 7. Such notching and scalloping, while preferred for angular alignment, may be substituted for by providing a continuous chamfer or flare on the end surfaces of one or both mast jacket portions.

In the actual steps of assembly of the device, the mast jacket portions 22 and 24 and the sleeve unit are first placed, generally in the relationship of FIG. 7, on a fixture which may be provided with suitable index feelers for generally aligning the three parts or subunits about their common axis to align the spheroids 40 and 42 with their respective starting notches and scallops. Notches, e.g. 48 and 50 on sleeve 44 and mast jacket portion 24, receive the feelers for this indexing. While various motion alternatives are available, it is preferred to mount the smaller mast jacket portion 24 stationary on one end of the fixture and to assemble the parts by relative movement thereto of the sleeve 44 and mast jacket portion 22. Thus, sleeve 44 with the spheroids 42 and 40 therein, is next moved to be placed over the end of the lower mast jacket portion 24, to assume the relationship of FIG. 6. Spheroids 42 are seated directly in their starting notches and scallops 42a and 42b and the other row of spheroids 40 rests on the outer surface of jacket portion 24. The projection of a good portion of the spheroids 40 under the surface of sleeve 44 aids the seated spheroids 42 in causing the sleeve to take a somewhat frusto-conical shape as shown, accommodated of course by the slit or gap 46 therein. This is advantageous in the next step involving the movement, by an hydraulic ram or like mechanism on the fixture, of the mast jacket portion 22 from the position of FIG. 6 toward and freely over the sleeve 44 and the mast jacket portion 24 to a position wherein its end 47 is relatively located at 47' shown in broken lines in FIG. 3. In this movement, again, end 47 of the mast jacket portion 22 easily slips over the leading edge of sleeve 44 and at this last described position, there is yet no interference engagement between the parts. The marginal edge portion or end 47 of the portion 22 is however now directly engaged with the annulus of spheroids 40 which are seated in the notching and scalloping 40a and 40b. Accordingly, with all spheroids thus seated between an inclined scallop on one side and a cylindrical surface on the other, further forced telescoping of the mast jacket portions 22 and 24 together from this intermediate position indicated in broken lines in FIG. 3 will force the two sets of spheroids 40 and 42 to roll up the incline of their respective starting scallops 40b and 42b and into interfering engagement between the mast jacket portions on the full cylindrical surfaces thereof. With the spheroids 40 and 42 thus engaged, forced telescoping of the mast jacket portion is continued causing rolling of the spheroids and axial displacement of sleeve 44 with the forcibly moved portion 22 at half the rate of the latter, until the spheroids are positioned sufficiently inwardly of the marginal edges or ends of the two portions. This is shown in FIG. 3 in solid lines, which also indicates the furrowing or grooving in the mast jacket portions and the two-to-one movement relationship between portion 22 and sleeve 44 arising during this assembly operation.

Upon initial interception of the various spheroids 40 and 42 with the cylindrical surfaces of the mast jacket portions for the full designed interference fit therewith, there is at once established the design load or axial force required for rolling of the spheroids to cause the grooving or furrowing in the portions. This of course is the same force selected as the energy dissipating force threshold for the device in whatever impact loading conditions encountered in use with the steering column assembly 12. The assembly fixture may thus be a convenient means of inspecting or measuring the energy absorption which the assembled steering column or mast jacket 20 will provide, merely by taking readings from a load cell or axial force transducer properly located in the assembly fixture.

With respect to the construction of sleeve 44 or equivalent spheroid guidance member, it is to be noted that certain alternatives are available to accomplish the guidance and also the assembly functions thereof. For example, rather than providing for press fit of the spheroids within the spheroid apertures, the walls of the sleeve may be constructed in the region of each aperture to have socket-like or similar ball retaining conformation not necessarily depending on tight fit of the spheroids therein.

Having thus described the invention, what is claimed is:

1. In an impact energy absorbing device of the type including a pair of coaxial inner and outer tubular members telescopable relative to each other under force applied thereto and a plurality of rolling bodies engaged between said members with predetermined interference fit and having hardness sufficiently higher than said members as to be operative to roll during telescopic movement therebetween and cause predetermined plastic deformation therein to absorb the energy of such movement, the improvement comprising a sleeve member mounted intermediate said members coaxially therewith and being provided with a plurality of predeterminedly spaced perforations each receiving rollably therein one of said rolling bodies, at least one of said members having on one end thereof deformed marginal edge portions shaped over a limited longitudinal extent to provide tapered wall regions therein to reduce the interference of said predetermined interference fit of said rolling bodies between said members to facilitate the assembly of said sleeve with said rolling bodies therebetween.

2. In an impact energy absorbing device of the type including a pair of coaxial inner and outer cylinders telescopable relative to each other under force applied thereto and a plurality of rolling bodies engaged between said cylinders with predetermined interference fit and having hardness sufficiently higher than said cylinders as to be operative to roll during telescopic movement therebetween and cause predetermined plastic deformation therein to absorb the energy of such movement, the improvement comprising, a sleeve member constructed of plastic material mounted intermediate said cylinders coaxially therewith and being provided with a plurality of predeterminedly spaced perforations each sized predeterminedly smaller than the diameter of a said rolling body to be received therein and being arranged in at least two annular rows spaced axially of the sleeve, the perforations of one row being staggered angularly relative to the perforations of the adjacent row or rows, said perforations each receiving by predetermined press fit therein one of said rolling bodies for retention thereof within said sleeve, said sleeve during telescopic movement of one of said cylinders relative to the other cylinder holding said rolling bodies to roll between said cylinders in said predetermined spaced relationship of said perforations upon overcoming said press fit and move as a unit with said sleeve relative to said other cylinder, at least one of said members having on one end thereof deformed marginal edge portions shaped over a limited longitudinal extent to provide tapered wall regions therein to reduce the interference of said predetermined interference fit of said rolling bodies between said members to facilitate the assembly of said sleeve with said rolling bodies therebetween.

3. In a method of assembly of an energy absorbing device of the type including inner and outer telescopically movable tube members, an end portion of one of said members having a deformed marginal edge providing tapering wall regions therein, a plurality of rolling bodies sized to be engaged between adjacent mutually facing surfaces of said members with predetermined interference fit, and a sleeve fitted coaxially intermediate said members and adapted to rollably receive said rolling bodies, the steps comprising, mounting said rolling bodies for retention within at least one annular row of spaced perforations in said sleeve about the perimeter thereof, mounting the sleeve on said end of said one of said members with said rolling bodies engaged on said tapering wall regions, placing an end of the other member on said sleeve in a position locating said row of rolling bodies off the respective said facing surface of such other member and adjacent the marginal edge of the end thereof, forcibly telescoping said members together in a direction to establish initial engagement between said rolling bodies, the said tapering wall regions of said one member, and the said facing surface of said other member at said marginal end of the latter, and continuing the forcible telescoping between said members in the same direction to cause said rolling bodies to roll over said tapering wall regions into interfering engagement between said facing surfaces and simultaneously translate said sleeve with one of the members relative to the other member at substantially one half the rate of the last mentioned one member.

4. In a method of assembly of an energy absorbing device of the type including inner and outer telescopically movable tube members, a plurality of rolling bodies sized to be engaged between said members with predetermined interference fit, and a split plastic sleeve fitted coaxially intermediate said members and adapted to rollably receive said rolling bodies, the steps comprising, mounting said rolling bodies with a predetermined press fit within perforations of said sleeve arranged in at least two annular rows about the perimeter of the sleeve spaced from each other axially therealong, moving the sleeve axially onto an end of one of said members to have at least one of said rows of rolling bodies located fully on the peripheral surface of said one member and another of said rows located off such surface adjacent the marginal edge thereof such that said split sleeve takes a frustoconical shape, telescoping an end of the other member onto said sleeve and said one member to a position locating its marginal edge adjacent said one row of rolling bodies out of interfering engagement therewith and juxtaposing its peripheral surface to said another row of rolling bodies, and forcibly telescoping said members together in a direction bringing both said marginal edges into interfering engagement with the respective said adjacent rows of rolling bodies to thereafter cause rolling of said rolling bodies within said sleeve over the peripheral surfaces of said members.

References Cited

UNITED STATES PATENTS

| 2,774,430 | 12/1956 | Blazek | 308—4 |
|---|---|---|---|
| 3,392,599 | 7/1968 | White | 74—492 |

FOREIGN PATENTS 639,894   4/1962   Canada.

MILTON KAUFMAN, Primary Examiner

U.S. Cl. X.R.

29—149.5, 434; 188—1